(12) United States Patent
Ohnesorge

(10) Patent No.: US 7,093,369 B2
(45) Date of Patent: Aug. 22, 2006

(54) RETAINING DEVICE FOR A WHEEL ALIGNMENT ANALYZER

(75) Inventor: Axel Ohnesorge, Burgwedel (DE)

(73) Assignee: Horst Warkotsch, Burgwedel (DE)

( * ) Notice: Subject to any disclaimer, the term of this patent is extended or adjusted under 35 U.S.C. 154(b) by 0 days.

(21) Appl. No.: 11/055,972

(22) Filed: Feb. 14, 2005

(65) Prior Publication Data

US 2005/0206098 A1 Sep. 22, 2005

Related U.S. Application Data

(63) Continuation-in-part of application No. PCT/EP03/08605, filed on Aug. 4, 2003.

(30) Foreign Application Priority Data

Aug. 13, 2002 (DE) .................... 102 37 647

(51) Int. Cl.
*G01B 21/26* (2006.01)
*G01B 5/255* (2006.01)
(52) U.S. Cl. .................... 33/203.18; 33/288; 33/336
(58) Field of Classification Search ............. 33/203.18, 33/203, 203.15, 203.16, 203.17, 203.19, 33/203.2, 288, 336; 356/139.09, 155
See application file for complete search history.

(56) References Cited

U.S. PATENT DOCUMENTS

| 3,990,666 A | 11/1976 | Morrison et al. |
| 4,185,917 A | 1/1980 | Alsina |
| 4,815,216 A * | 3/1989 | Swayne .................... 33/203.18 |
| 5,024,001 A * | 6/1991 | Borner et al. ............. 33/203.18 |
| 5,987,761 A | 11/1999 | Ohnesorge |
| 6,131,293 A * | 10/2000 | Maioli et al. ............ 33/203.18 |
| 6,338,273 B1 | 1/2002 | Warkotsch |
| 2002/0170195 A1* | 11/2002 | Corghi ........................ 33/520 |

FOREIGN PATENT DOCUMENTS

| DE | 79 22 976 U1 | 11/1979 |
| DE | 89 07 578.1 | 10/1989 |
| DE | 38 15 559 A1 | 12/1998 |
| DE | 198 53 579 A1 | 9/1999 |
| DE | 202 06 404 U1 | 8/2002 |
| FR | 2 393 271 | 12/1978 |
| FR | 2711422 A1 * | 4/1995 |

OTHER PUBLICATIONS

International Search Report dated Dec. 23, 2003 in International Application No. PCT/EP03/08605 filed Aug. 4, 2003 (3 pages).

* cited by examiner

*Primary Examiner*—R. Alexander Smith
(74) *Attorney, Agent, or Firm*—David S. Safran

(57) ABSTRACT

Retaining device for a wheel-alignment analyzer for attachment to a wheel of a motor vehicle. Retaining device has a retaining element having at least three retaining arms and a clamping mechanism which can be displaced along the retaining arms. The ends of the clamping mechanism are provided with an overlapping portion for overlapping the edge of the rim and the retaining element can be secured to the edge of the rim. The retaining device offers a stable engagement and centering solution, thus permitting a correct wheel-alignment analysis. The overlapping portion may be spring-loaded and biased in the direction of the wheel and/or the clamping mechanism, and a spacer and the overlapping portion may be provided on the spacer.

12 Claims, 7 Drawing Sheets

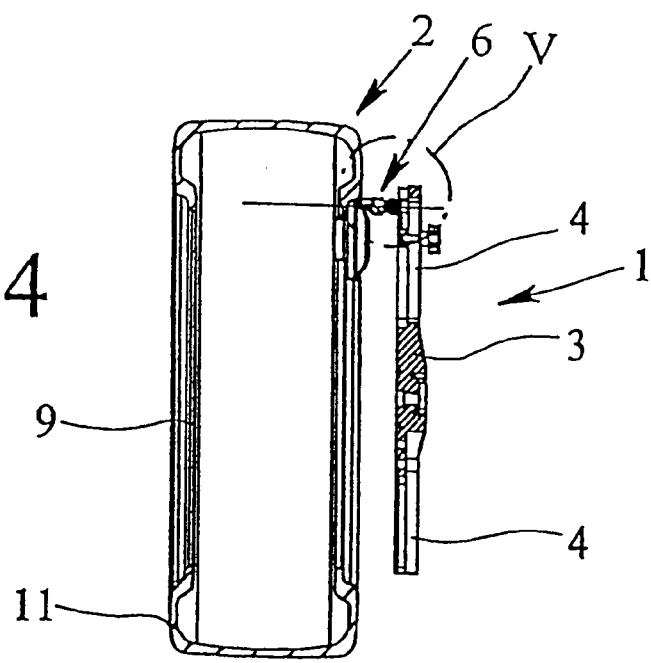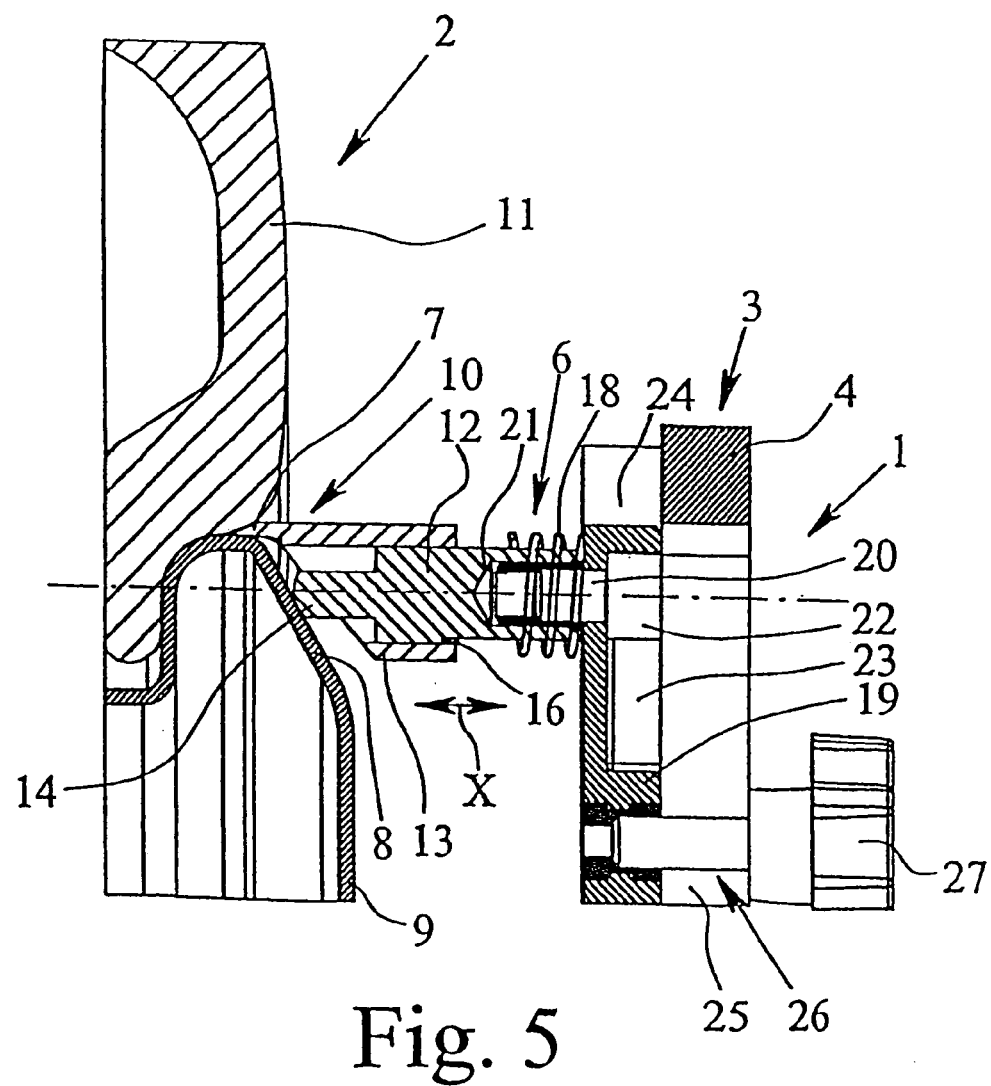

RETAINING DEVICE FOR A WHEEL ALIGNMENT ANALYZER

CROSS REFERENCE TO RELATED APPLICATIONS

This application is a continuation-in-part of application no. PCT/EP2003/008605, filed Aug. 4, 2003, which claims the priority of German application no. 102 37 647.6, filed Aug. 13, 2002, and each of which is incorporated herein by reference.

FIELD OF THE INVENTION

The invention relates to a retaining device for a wheel alignment analyzer for attaching to the wheel of a motor vehicle. More specifically, the invention relates to a retaining device for a wheel alignment analyzer attachable to a wheel of a motor vehicle and that includes a retaining element engageable with an edge of a rim of a wheel by use of a clamping element, and an overlapping portion being provided on the clamping element for enhancing the engagement with the rim. Even more particularly, the invention relates to a retaining device for a wheel alignment analyzer attachable to a wheel of a motor vehicle and that includes a retaining element engageable with an edge of a rim of a wheel by use of a clamping element, an overlapping portion being provided on the clamping element for enhancing the engagement with the rim, and the overlapping portion being biased in the direction of a wheel, in use.

BACKGROUND OF THE INVENTION

To yield reliable results when analyzing wheel alignment, a retaining device for a wheel alignment analyzer must be precisely centered over the center of a wheel. Because there are countless types of motor vehicle rims, which differ from one another in terms of shape, diameter and material, there are, as a result, various retaining devices with differing fastening systems. Currently known retaining devices are attached to the proper portion of the wheel with corresponding clamps, magnets or studs that are suitable for determining the center of the rim.

Retaining devices for fastening a wheel alignment system to the wheel of a motor vehicle are already described in DE 202 06 404 U1, DE 79 22 976 U1 and U.S. Pat. No. 399,066. These retaining devices have a retaining element consisting of a number of retaining arms, along which are adjustable clamping mechanisms. The end of each clamping mechanism has an overlapping portion which overlaps the edge of the rim, whereby the retaining element can be firmly secured on the edge of the rim via the clamping mechanism. The disadvantage with the previously known retaining devices is the fact that the available clamping mechanisms cannot be fastened to different types of rims without further modifications.

In DE 38 15 559 A1, a retaining device for a wheel alignment analyzer is shown in which the retaining means grips the wheel rim.

In DE 198 53 579, a retaining device of the prior art is described that contains a spacer adjustable along the retaining arms, and that feature magnets on the rear side so as to allow the device to be attached on the front side to a out rim. Because this known retaining device employs a magnetic attachment elements this retaining device is not suited to modern soft-line aluminum rims.

Other known patent documents include:
DE 8907578 Aug. 24, 1989;
U.S. Pat. No. 4,185,917 Jan. 29, 1980;
FR 2393271 Dec. 29, 1978;
U.S. Pat. No. 5,987,761 to Ohnesorge;
U.S. Pat. No. 6,338,273 B1 to Warkotsch; and
WO 00/06984 to Warkotsch.

OBJECTS AND SUMMARY OF THE INVENTION

It is an object of the invention to overcome the drawbacks of the prior art.

An object of the invention is to produce a retaining device of the type already described that offers a clamping and centering solution with a lasting and stable holding and engagement, and that facilitates correct wheel alignment analysis for all types of rims currently available.

According to the invention, this object can be accomplished by biasing, such as by spring-loading, an overlapping portion in the direction of the wheel.

The object can also be accomplished by providing a clamping mechanism with a spacer and configuring an overlapping portion attached to the spacer to be displaceable in the direction of the wheel, in use.

In summary, an embodiment according to the invention may have a spacer fixed relative to the overlapping portion, the latter of which is displaceable in the direction of the wheel, and has the advantage that the retaining device according to the invention can be adapted to various types of rims without further modification. The spacer ensures that the retaining element is held at a precisely specified distance relative to the rim in all cases. Because it is displaced in relation to the spacer, the overlapping portion can be configured and adapted to fit the dimensions of the edge of a given rim. In this respect, it is particularly advantageous that the overlapping portion be biased or spring-loaded in the direction of the wheel. Because of the spring action, it is always automatically set (e.g., biased) into an optimal position to overlap the edge of the rim.

To allow the overlapping portion to fit in a space between the edge of the rim and the tire in a simple manner, it is flattened and chiseled at its end, whereby the flat surface of the overlapping portion runs tangentially to the edge of the rim.

In an especially simple configuration, the spacer is configured as a bolt, while the overlapping portion is provided on a socket connected to the bolt.

To prevent damage to the rims when engaging the retaining device with a wheel, the spacer has a rounded stud for mounting on the rim. The rounded construction of the stud allows a precise placement in a region on the edge of the rim without scratching the surface of the rim.

It is also preferable that the socket be permanently attached to spacer, thus making it impossible to loosen the socket when fitting the retaining element to the rim or to unintentionally loosen or lose the socket. Because the socket cannot be loosened from the spacer, it is also ensured that the surface side of the overlapping portion runs correctly along, that is, tangentially to the edge of the rim, thus allowing the flat side of the overlapping portion to lie in a level position over the edge of the rim when the retaining device is engaged.

In order for the retaining device to be fixed onto the wheel, the spacer is attached along with the socket and spring to a slider that is displaceable along the retaining arm, whereby the slider forms a sliding component with the spacer, thereby forming a radially displaceable clamping mechanism which is radially displaceable along the retaining arm. That will be done in a manner in accordance with the construction of the retaining arm, as will be appreciated. The clamping mechanism is then locked into place once the overlapping portion is aligned with the edge of the rim, thereby securing the retaining device to the rim.

The assembly can be constructed in a simple manner by use of a spring, such as a coil spring provided around the spacer, with one end of the spring abutting the slider element and the other end of the spring abutting the socket.

To firmly secure the spacer on the slider or slider element, a simple threaded connection is preferably used, in which a screwhead may fit in a recess on the slider. In this way, the screwhead does not protrude above the surface of the slider and cannot interfere with free movement of the slider along a respective retaining arm. The recess can be configured as either a rounded or elongated opening. An elongated opening allows a certain degree of adjustability of the spacer on the slider.

To ensure the longitudinal movement in a radial direction relative to the rim along a respective retaining arm, the slider is fitted in an elongated groove on a side of the retaining arm facing the wheel. The groove should therefore be constructed in a manner that facilitates a virtually clearance-free positioning of the slider transversely to, or at right angles to the direction of displacement.

The side of the retaining arm facing away from the wheel may have an elongated opening in such a groove, by which the slider can be fastened from the outside with a fastener, such as a screw. In a preferable configuration, a knob, such as a rotatable knob, is provided to allow the slider to be manually fixed in position.

A retaining device in accordance with the invention is set forth, in which a simple fastening and a minimum of steps, or a minimal number of turns, or a centering solution through the overlapping of the edge of the rim and securing of the clamping mechanism with minimal number steps, such as by use of a minimal number of parts, such as a minimal number of adjustment elements, such as handles, is possible.

Relative terms such as up, down, left, and right are for convenience only and are not intended to be limiting.

Various embodiments of the invention are shown in the following figures and related detailed description below.

BRIEF DESCRIPTION OF THE DRAWINGS

FIG. 4 is a sectional view of a portion of the retaining device placed on a wheel;

FIG. 5 is an enlarged view of detail V taken from FIG. 4;

DETAILED DESCRIPTION OF THE INVENTION

Figure 1:
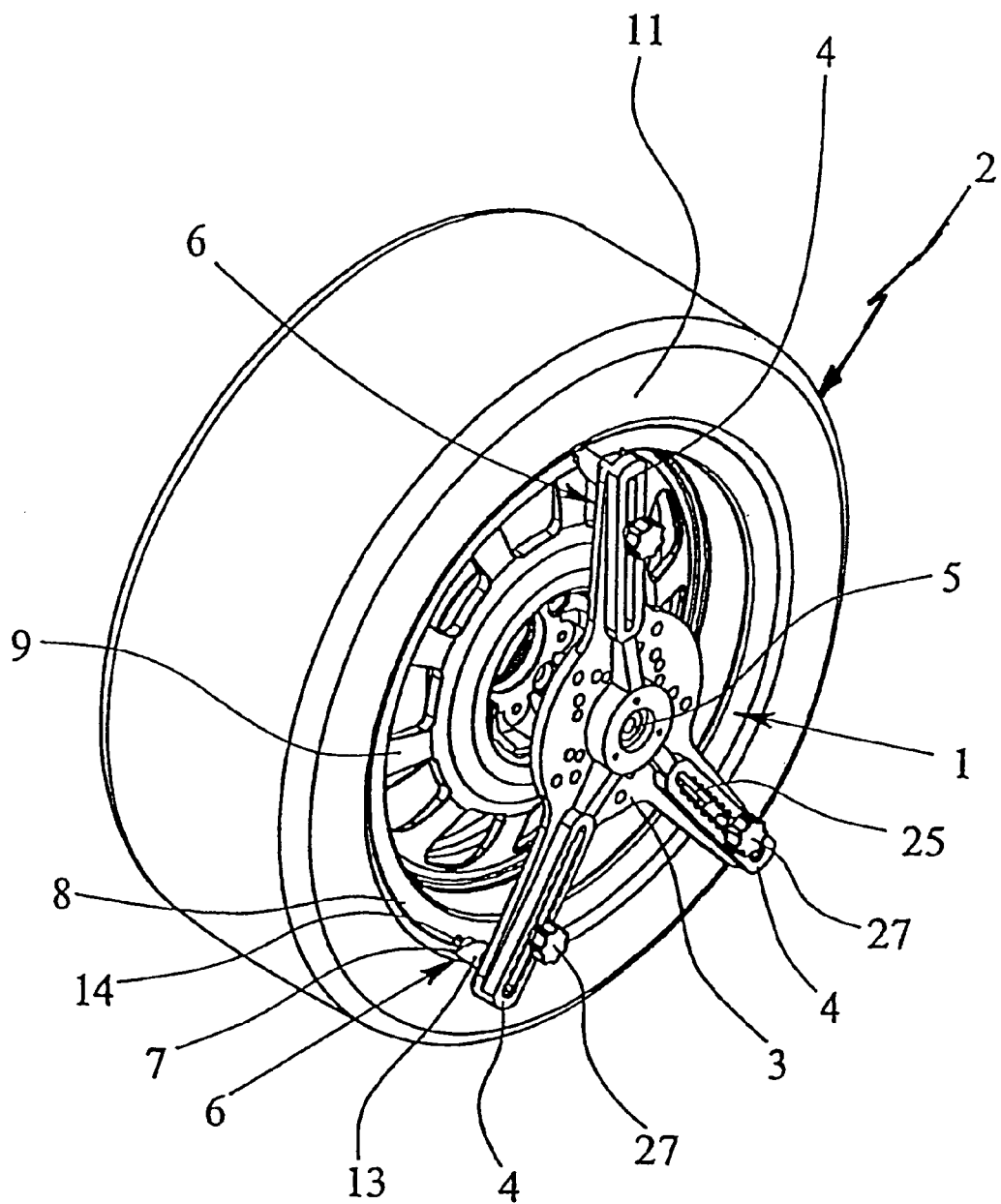
FIG. 1 is a perspective view of a wheel alignment system provided on a wheel and rim.

The individual figures illustrate a retaining device 1 for a wheel alignment analyzer (not shown) to be mounted onto a wheel 2 of a motor vehicle.

The retaining device 1 has a retaining element 3 including three retaining arms 4. It is understood that more than three retaining arms 4 can be provided. A central opening 5 is provided in the retaining element 3 to connect to the unillustrated wheel-alignment analyzer. Each retaining arm 4 features a clamping element or mechanism 6, which can be manually slid along the retaining arm 4 in a radial direction.

The clamping element or mechanism 6 may include an overlapping portion 7 at its end to overlap an edge 8 of rim 9, whereby the retaining element 3 can be secured on the edge 8 of the rim 9 by clamping mechanism 6.

Figure 3:
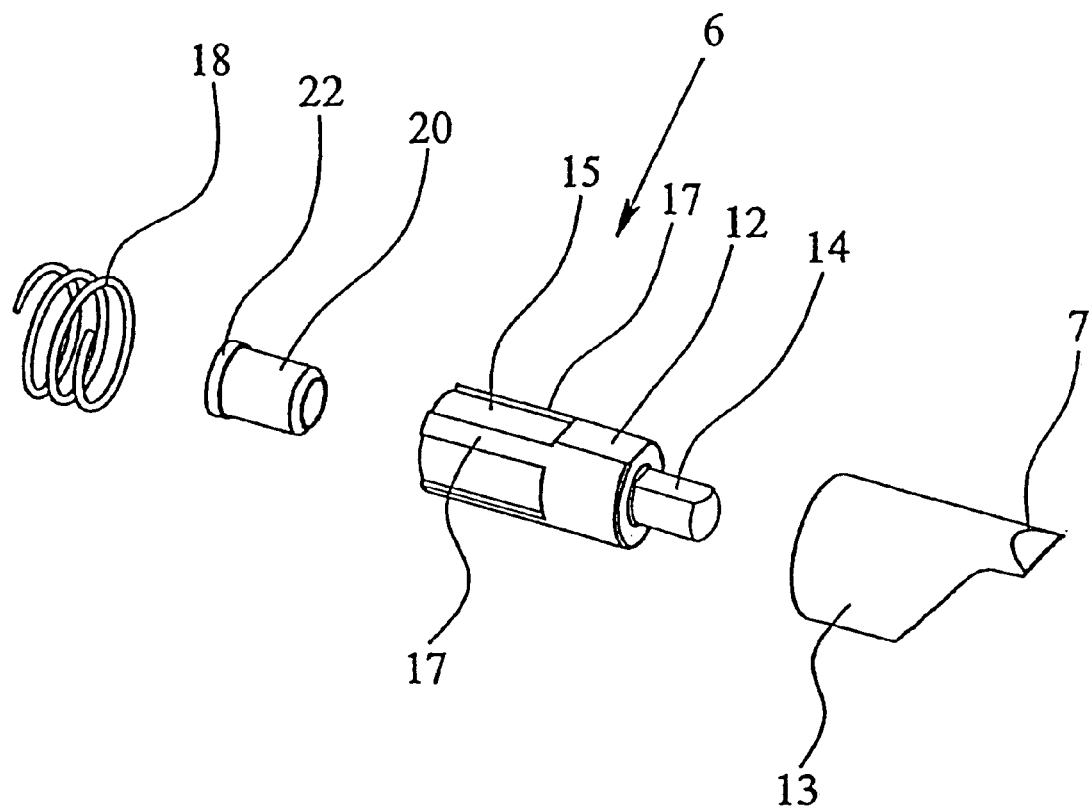
FIG. 3 is a perspective exploded view of a component of the clamping mechanism of a retaining device according to the invention.

As in FIG. 3, for example, the overlapping portion 7 is flattened and chiseled at its end, allowing the overlapping portion 7 to be placed in a simple manner in a space 10 between the edge of the rim 8 and a tire 11.

When the retaining device 1 is engaged as illustrated in FIG. 1, the flat side of the overlapping portion 7 runs tangentially to the edge of the rim. The term tangential is understood not only to mean punctiform but also to mean flat contact resulting from an arc-shaped construction of the overlapping portion 7, whereby the overlapping portion 7 rests flatly on the edge of the rim.

Although it is possible in principle that the overlapping portion 7 is axially fixed relative to retaining element 3, the overlapping portion 7 in the illustrated embodiment is adjustably fixed along the X axis by a spacer 12 attached to the retaining arm 4. The overlapping portion 7 is springloaded in the direction of the wheel 2. The spacer 12 itself may be configured as a bolt, while the overlapping portion 7 may be provided on a socket 13 engaged with the bolt. The spacer 12 has a rounded stud 14 at one end that rests flush against the edge 8 of the rim when the retaining device is engaged. The socket 13 itself may be permanently attached to the spacer 12. Furthermore, the socket 13 can be restricted from turning relative to the spacer 12. To keep the socket 13 permanently attached to the spacer 12, the spacer 12 has at least one nut 15, and on the end of which presses the socket 13 with a stop 16. The nut 15 is bordered on the sides by protrusion(s) 17, between which the stop 16 is positioned with virtually no clearance. The protrusions(s) 17 and the nut 15 form a guide and thereby prevent the turning of the socket 13 on the spacer 12.

Figure 2:
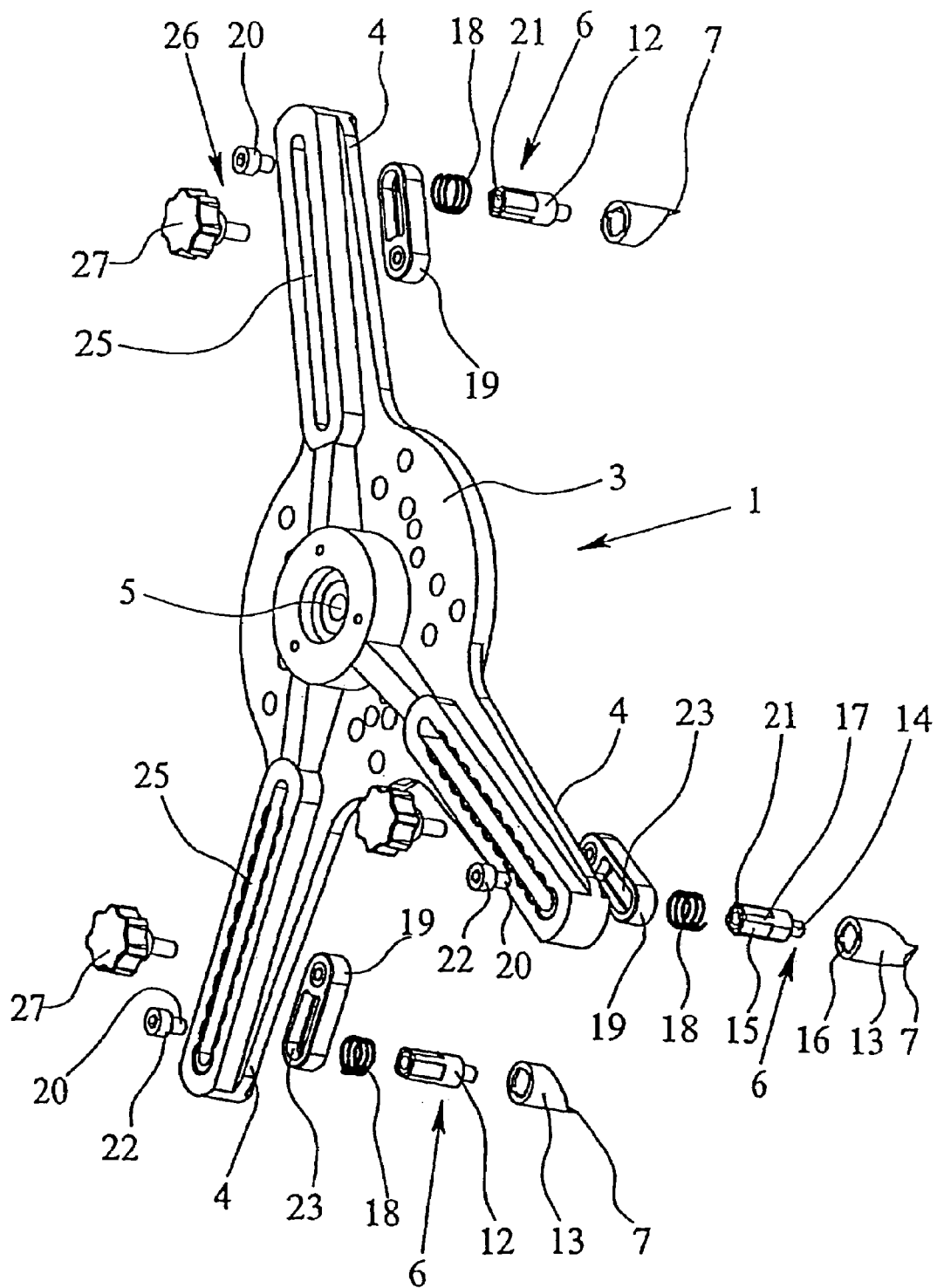
FIG. 2 is a perspective exploded view of the retaining device of FIG. 1.

The spacer 12 is attached along with the socket 13 and the spring 18 to a slider or slider element 19 that is displaced along the retaining arm 4, and thereby in a radial direction relative to the rim. The slider 19 forms with the spacer 12 and the components attached thereto an assembly which can be slid along the respective retaining arm 4 and constitutes the clamping mechanism 6. A spring 18 is illustrated in FIG. 2 as a coil spring (not shown in all the Figs.) surrounding the spacer 12, with one end against the slider 19 and with another end against a lower facing edge of the socket. The spring 18 is configured and selected for pushing the socket 13 sufficiently far toward the wheel 2 until the stop 16 presses against the end of nut 15.

The spacer 12 is threadedly attached to the slider 19. The threaded engagement may be accomplished with a screw 20, which is screwed into a threaded opening 21 in the spacer 12. A head 22 of such a screw 20 may be fit into a depression 23 of the slider 19 and does not protrude above the slider 19, thereby ensuring that the slider 19 can be freely moved along the retaining arm 4. As shown, the depression 23 may be configured as an elongated opening.

The slider 19 itself fits into an elongated groove 24 in the retaining arm 4 on a side of the arm 4 facing the wheel 2. The width of the groove 24 is almost exactly equal to the width of the slider 19, facilitating clearance-free positioning transverse to, such as at a right angle to, the direction of displacement. The groove 24 on the side of the retaining element 3 facing away from the wheel 2 opens into an elongated opening 25, and the slider 19 can be fixed into position with a threaded connection 26, when the overlapping portion 7 is located on the edge of the rim 8. A knob 27, such as a rotatable handle, is provided for manually securing the slider 19 into fixed position.

Figure 6:
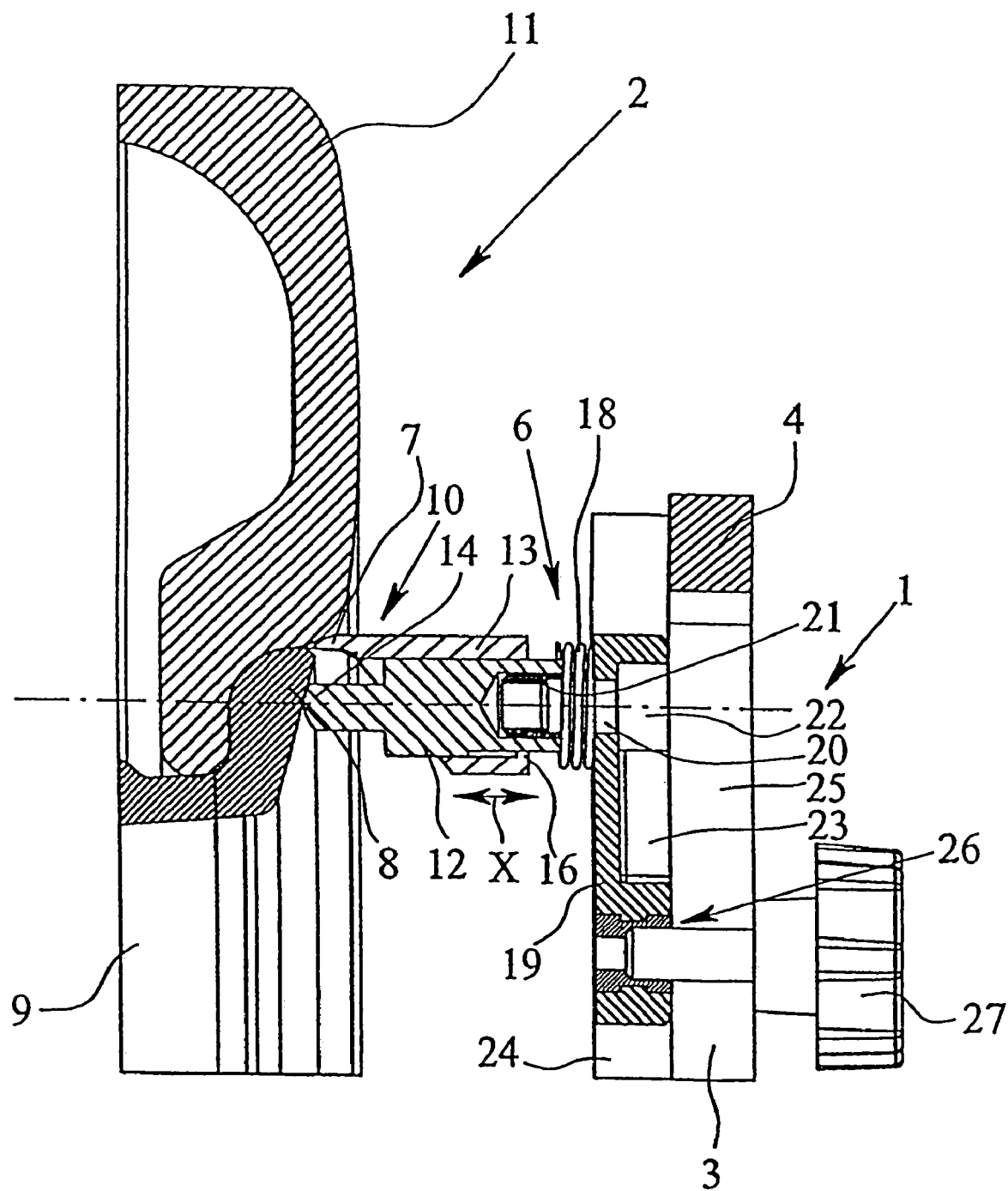
FIG. 6 is an illustration corresponding to the embodiment of FIG. 5 of a retaining device used on a different type of wheel and rim.
Figure 7:
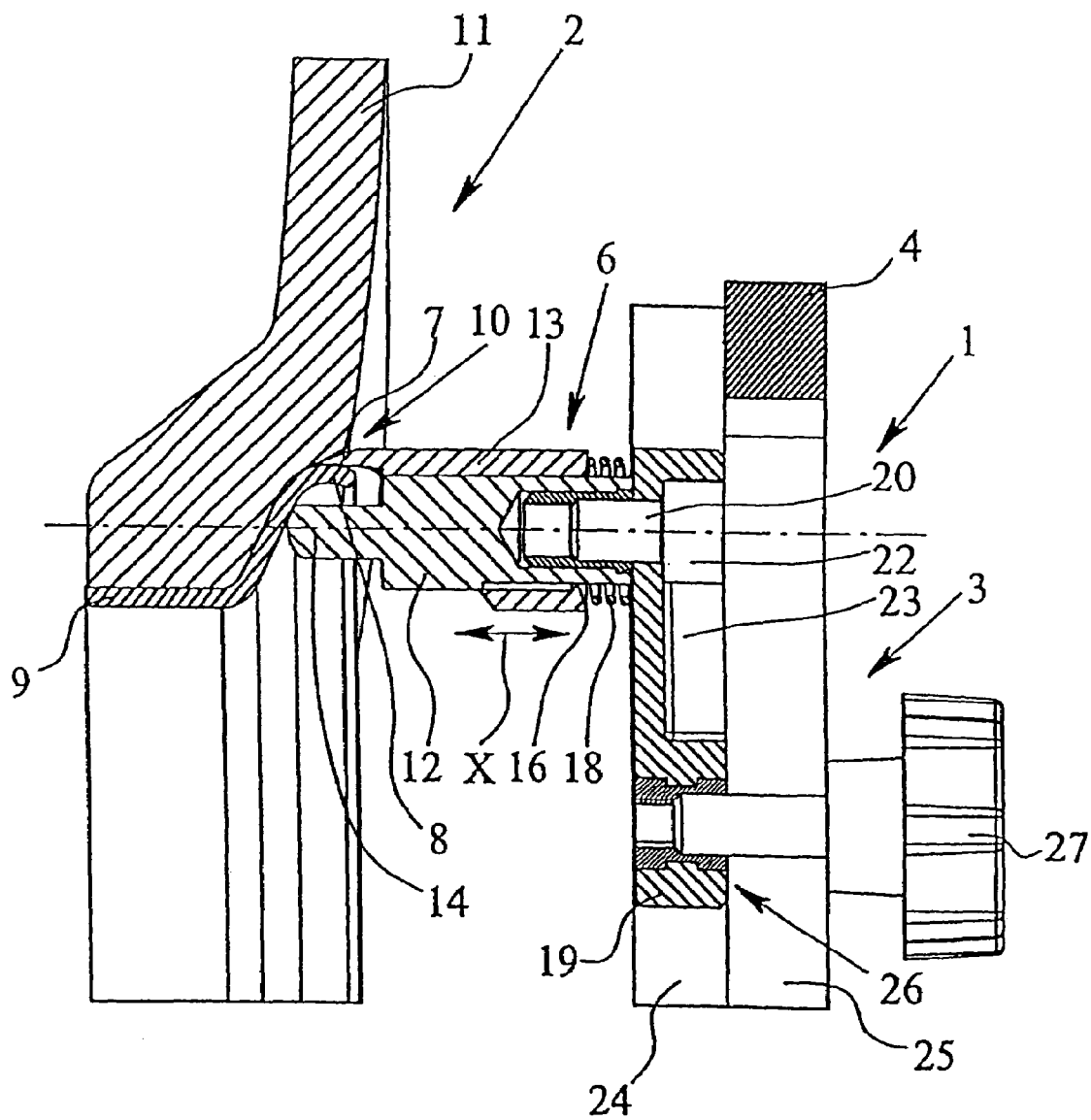
FIG. 7 is an illustration corresponding to the embodiment of FIG. 5 of a retaining device used on a different wheel.

FIGS. 5, 6 and 7 differ from one another in that FIG. 5 illustrates the retaining device 1 being secured on a softline-rim, FIG. 6 shows the retaining device 1 being secured on a standard aluminum rim, and FIG. 7 shows the retaining device 1 being secured on a conventional steel rim.

As a comparison of FIGS. 5, 6 and 7 in particular reveals, the stud 14 and the overlapping portion 7 are configured so that the end of the overlapping portion 7 protrudes further than the stud 14 when extended fully outward (i.e., to left in direction of arrow) as shown in FIG. 5, while the end of the overlapping portion 7 is retracted further than the stud 14 when drawn fully inward as shown in FIG. 7. Between these two settings all other positions are possible.

The fixing of the inventive retaining device 1 to the wheel 2 is accomplished by first setting the clamping element or mechanism 6 radially relative to the diameter of the rim. The retaining element 3 is then positioned against the rim 9. With their respective studs 14, spacers 12 make contact with the outside of the rim 9. At the same time, each edge 8 of the rim is overlapped by the overlapping portion 7. The overlap automatically occurs as a result of the biasing of spring 18. The clamping mechanism 6 can then be secured using the respective knob 27. If the knob 27 is securely tightened a force will be simultaneously and manually applied radially to the opening 5, resulting in the fixed contact of the respective overlapping portion 7 along the edge 8 of the rim 9. Once all clamping elements or mechanisms 6 are secured, the retaining device 1 is then fixed on the wheel.

Figure 8:
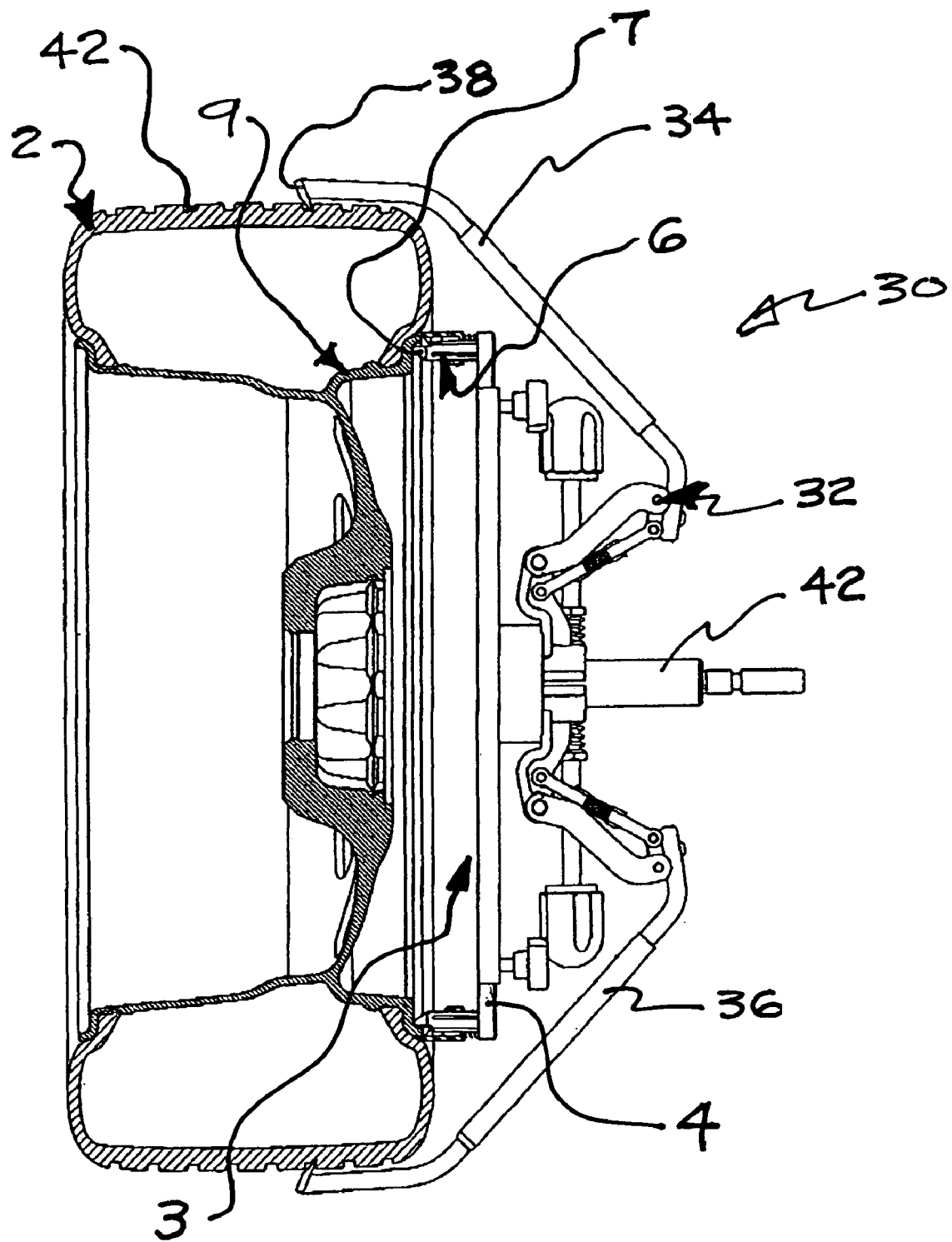
FIG. 8 is a sectional view of another embodiment of a retaining device according to the invention.

FIG. 8 illustrates another embodiment of a retaining device 30 for a wheel alignment analyzer in accordance with the invention.

Retaining device 30 may be provided with a securing device 32, such as the illustrated linkages including an upper arm 34 and a lower arm 36, as viewed in FIG. 8. Arms 34 and 36 may be provided for enhancing the engagement between retaining element 3 and rim 9, which engagement with rim 9 has already been accomplished directly at rim 9 thanks to clamping elements 6 on retaining arm 4 of retaining element 3, as described above.

It will already have been understood that the engagement between clamping element 3 and rim 9 ensures the proper radial positioning, and radial adjustment to enhance the engagement between retaining element 3 and rim 9, as described above. The various configurations possible for overlapping portions 7 of clamping element 6 have been described above.

Arms 34 and 36 may be configured to engage with a tread 42 of tire 2, such as described in U.S. Pat. No. 5,987,761 to Ohnesorge, issued Nov. 23, 1999, which is incorporated herein by reference. One may refer to FIG. 1 and the related text of Ohnesorge '761 that is incorporated herein by reference. Thus, for example, the engagement between arms 34 and 36 and tread 42 may be further enhanced by the use of a respective hook 38 on an end thereof, as shown.

Further, as described in Ohnesorge '761, an axle support 42 may be provided in a manner similar to that described in Ohnesorge '761. It will be appreciated that this further retaining and engagement element 34 of FIG. 8 which further secures wheel 2 relative to the retaining device may be used with each of the embodiments of FIGS. 1–7, as will be readily understood.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A retaining device for a wheel alignment analyzer to be attached to a wheel of a motor vehicle, comprising:
    a) a retaining element having at least three retaining arms;
    b) respective clamping elements adjustable along respective ones of the retaining arms;
    c) an overlapping portion being provided at one end of the respective clamping elements, the overlapping portion being configured for overlapping an edge of a rim of a wheel, in use;
    d) the retaining element being attachable to an edge of a rim of a wheel by the clamping element, in use;
    e) the clamping elements includes a spacer;
    f) the overlapping portion being attached to the spacer and displaceable in the direction of an attached wheel, in use;
    g) the overlapping portion is spring-loaded and biased in the direction of the wheel, in use; and h) the overlapping portion is displaceable relative to the spacer, the overlapping portion being configured and adapted to fit dimensions of the edge of the rim.

2. Retaining device as in claim 1, wherein:
    a) the overlapping portion is flattened and chiseled at an end which engages a rim of a wheel, in use; and
    b) the overlapping portion extends tangentially to the edge of the rim when the retaining element engages the rim, in use.

3. Retaining device as in claim 1, wherein:
    a) the spacer includes a bolt; and
    b) the overlapping portion includes a socket attached to the bolt.

4. Retaining device as in claim 3, wherein:
    a) the socket is permanently attached to the spacer.

5. Retaining device as in claim 1, wherein: a) an end of the spacer includes a rounded stud configured as a contact point with a rim of a wheel, in use.

6. A retaining device for a wheel alignment analyzer to be attached to a wheel of a motor vehicle, comprising:
    a) retaining element having at least three retaining arms;
    b) respective clamping elements adjustable along respective ones of the retaining arms;
    c) an overlapping portion being provided at one end of the respective clamping elements, the overlapping portion being configured for overlapping an edge of a rim of a wheel, in use;
    d) the retaining element being attachable to an edge of a rim of a wheel by the clamping element, in use;
    e) the clamping elements having a spacer including a bolt;

f) the overlapping portion having a socket attached to the bolt and displaceable in the direction of an attached wheel in use;
g) the spacer is secured with the socket;
h) a slider is displaceable along one of the retaining arms;
i) the slider together with the spacer define a sliding assembly displaceable along the one of the retaining arms; and
j) a spring is provided on the slider, the spring being configured for providing the biasing of the overlapping portion in the direction of the wheel, in use.

7. Retaining device as in claim 6, wherein:
a) the spring includes a coil spring provided around the spacer, one end of the coil spring abutting the slider and the other end of the coil spring abutting the socket.

8. Retaining device as in claim 6, wherein:
a) the spacer is attached to the slider by a screw having a screwhead;
b) a recess is provided on the slider; and
c) the screwhead fits in the recess and is disposed below a surface of the slider.

9. Retaining device as in claim 8, wherein: a) the recess includes an elongated opening.

10. Retaining device as in claim 9, wherein:
a) the slider moves along an elongated groove provided on a side of the retaining arm facing the wheel, in use; and
b) a groove is provided on the side of the retaining arm facing away from the wheel, the groove opening into the elongated groove.

11. Retaining device as in claim 6, wherein: a) the slider is fixedly attachable in position on the retaining arm by a threaded connection.

12. Retaining device as in claim 11, wherein: a) a knob is provided, the knob being configured for fixedly attaching the slider by the hand of a user, in use.

* * * * *